(12) United States Patent
Gaetano (10) Patent No.: US 7,411,659 B1
(45) Date of Patent: Aug. 12, 2008

(54) CROP DEVICE FOR FRAMING

(75) Inventor: Ralph R. Gaetano, Bethel Park, PA (US)

(73) Assignee: Think, Inc., West Mifflin, PA (US)

( * ) Notice: Subject to any disclaimer, the term of this patent is extended or adjusted under 35 U.S.C. 154(b) by 180 days.

(21) Appl. No.: 11/273,329

(22) Filed: Nov. 14, 2005

(51) Int. Cl.
 *G03B 27/58* (2006.01)
(52) U.S. Cl. .......................... 355/74; 355/126; 40/702; 40/732
(58) Field of Classification Search .................. 355/74, 355/122, 126; 40/600, 660.1, 700, 711, 725, 40/732, 734, 739, 765–768, 790, 798, 702, 40/726, 720–722, 730, 760, 761, 769
See application file for complete search history.

(56) References Cited

U.S. PATENT DOCUMENTS

| 154,581 | A | 9/1874 | Bushnell | 40/768 |
|---|---|---|---|---|
| 1,261,133 | A | 4/1918 | Kidd | 40/768 |
| 1,805,436 | A | 5/1931 | Barnard | 40/798 |
| 1,862,897 | A | 6/1932 | Klie | 40/700 |
| 2,534,961 | A | 12/1950 | Dunn | 95/79 |
| 3,295,674 | A | 1/1967 | Shore | 206/56 |
| 4,132,480 | A | 1/1979 | Reed | 355/75 |
| 5,534,971 | A | 7/1996 | Gaetano | 355/126 |
| 6,354,030 | B1 | 3/2002 | Harris | 40/711 |
| D487,355 | S | 3/2004 | Connolly | D6/301 |
| 2003/0084600 | A1 | 5/2003 | Peterson | 40/768 |

*Primary Examiner*—Della J. Rutledge
(74) *Attorney, Agent, or Firm*—Price & Adams (57) ABSTRACT

A sheet includes a plurality of incisions that define a plurality of frames. The frames are arranged in a geometric pattern to facilitate selection of an appropriate frame for cropping an image displayed on photographic media. The frames are connected to each other by an adhesive layer and substrate. Alternatively, the frames are connected by tags or micro-perfs. A transparent crop selector is used to facilitate selection of an appropriately sized frame.

27 Claims, 13 Drawing Sheets

CROP DEVICE FOR FRAMING

BACKGROUND OF THE INVENTION

1. Field of the Invention

This invention relates to a cropping device, and more particularly, to an improved apparatus and method for storing a plurality of standard size cropping frames for the framing of cropped images.

2. Description of the Related Art

Frames and mattes, herein generally referred to as picture frames, are routinely used in the presentation of images that are displayed on media, such as photographs, drawings, graphics, collages, or other visual formats. U.S. Pat. No. 154,581 discloses one such picture frame. U.S. Pat. No. Des. 487,355 discloses ornamental designs for magnetic frames.

U.S. Pat. No. 6,354,030 discloses a set of nested magnetic picture frames. The frames are fabricated from a multilayered flexible sheet. The sheet includes a layer of magnetic material, a layer that includes an image for display, and a tie layer that bonds the magnetic material to the image. Each frame includes a plurality of linear frame elements that can be releasably attached to a ferromagnetic surface, such as a refrigerator door.

U.S. patent application Pub. Ser. No. 2003/0084600 discloses a method and print media that is used to generate customized picture frames for the framing of photographs and other visual formats. The print media is layered with standard card stock or multiple ply material, such a flexible magnetic carrier. The print media includes a backing layer that is removably attached to the print media with pressure sensitive adhesive.

Photographic film is often processed to produce photographs for framing. Generally, the original exposure is not composed of an entirely satisfactory image. Thus, it is necessary to crop or mask around the desired portions of the image in order to produce a properly composed printed photograph. Such cropping may be accomplished through the use of cropping frames or masks.

U.S. Pat. No. 4,132,480 discloses a photographic cropping mask. The mask includes a planar card that is made from paper, plastic, or cardboard. The card includes a plurality of score lines that can be severed to form neatly defined rectilinear or other shaped openings. The card also includes an adhesive area to facilitate attachment of transparent film.

U.S. Pat. No. 2,534,961 discloses a printing mask. The mask includes a plurality of score lines that form removable sections. The mask is placed over a picture negative so that a suitable portion of the picture can be selected for cropping. The mask sections are attached to the negative with adhesive tape.

U.S. Pat. Nos. 3,295,674, 1,862,897, and 1,805,436 disclose cropping frames. U.S. Pat. No. 3,295,674 discloses a cropping frame that can be readily adapted to accommodate different sizes of pictures. U.S. Pat. No. 1,863,897 also discloses a method for making cropping frames. U.S. Pat. No. 1,805,436 discloses a cropping frame that is made from thermoplastic board.

U.S. Pat. No. 5,534,971 discloses a masking guide that includes a plurality of pivotally connected frames. Each frame includes four side portions that define proportionally decreasing rectilinear aperture areas. Each frame is pivotally connected to an adjacent frame for movement relative to the remaining masking frames to position a selected frame overlying a photographic proof, so that the aperture area defines an unmasked area of the photographic proof.

U.S. Pat. No. 1,261,133 discloses a mount for a picture frame. The mount includes a plurality of incisions that define individual concentric frames that can be removed from the mount. The frames are rectangular or oval-shaped with openings that are suitable for displaying images therein. The frames are used to display photographs or pictures. The innermost frames can be removed from the mount to increase the size of the opening to permit the display of larger photographs or pictures. Accordingly, while it is known to make nested frames, there is need for an improved cropping frame storage device.

SUMMARY OF THE INVENTION

In accordance with the present invention there is provided a cropping device. A sheet defines a plurality of detachable frames with each frame including an outer portion having a preselected geometry and an inner portion defining a viewing area. A substrate holds the frames in abutting relation to one another thereon with the frames forming an array to facilitate selection of an appropriately sized frame for cropping an image. An adhesive layer releasably connects the frames to the substrate. The sized frame connects to a medium for displaying an image for cropping with an outer perimeter of the sized frame viewing area defining an outer boundary for the cropped image.

Further in accordance with the present invention, there is provided an apparatus for cropping images. An essentially planar mask has a plurality of incisions with preselected geometries and dimensions to form a plurality of cropping frames. Each cropping frame has an inner edge defining a viewing area for displaying a cropped image and an outer edge abutting an adjacent frame. The cropping frames releasably connect to one another so that the cropping frames are arranged in a predetermined pattern to facilitate the selection of an appropriately sized cropping frame. The sized cropping frame has the ability to detach from the mask and attach to a medium for displaying an image for cropping with an outer perimeter of the sized frame viewing area defining an outer boundary for the cropped image.

Further in accordance with the present invention, there is provided a method for cropping an image. An essentially planar sheet is sectioned to form a plurality of connected cropping frames of preselected geometries and sizes with each frame having a preselected viewing area. The frames are positioned in a predetermined pattern in abutting relation to one another to facilitate the selection of one of the cropping frames. A selected cropping frame is selected from the planar sheet. The selected cropping frame is positioned in overlying relation to an image storage medium. The selected cropping frame viewing area is aligned with an image on the image storage medium so that the perimeter of the viewing area corresponds to the boundary of a desired portion of the image. The selected cropping frame is attached to the image storage medium.

Accordingly, a principal object of the present invention is to provide an improved apparatus and method for facilitating the selection of standard size frames for cropping images for the scrapbooking industry.

Another object of the present invention is to provide an improved cropping device that includes cropping frames that are releasably attached to one another.

A further object of the present invention is to provide a cropping device that includes adhesively bonded cropping frames that can be releasably attachable or removable from a substrate.

A further object of the present invention is to provide improved cropping frames that are adhesively bonded to image displaying media.

These and other objects of the present invention will be more completely described and disclosed in the following specification, accompanying drawings, and appended claims.

DESCRIPTION OF THE PREFERRED EMBODIMENTS

Referring to the drawings and, particularly, to FIGS. 1-9, there is shown a cropping device generally designated by the numeral 10. The cropping device 10 includes a sheet 12 that is generally divided into a plurality of cropping frames 14a-h for cropping pictures or other similar images. The cropping frames 14 are arranged in an abutting relation to one another to form a concentric array of nested frames 14.

Figure 2:
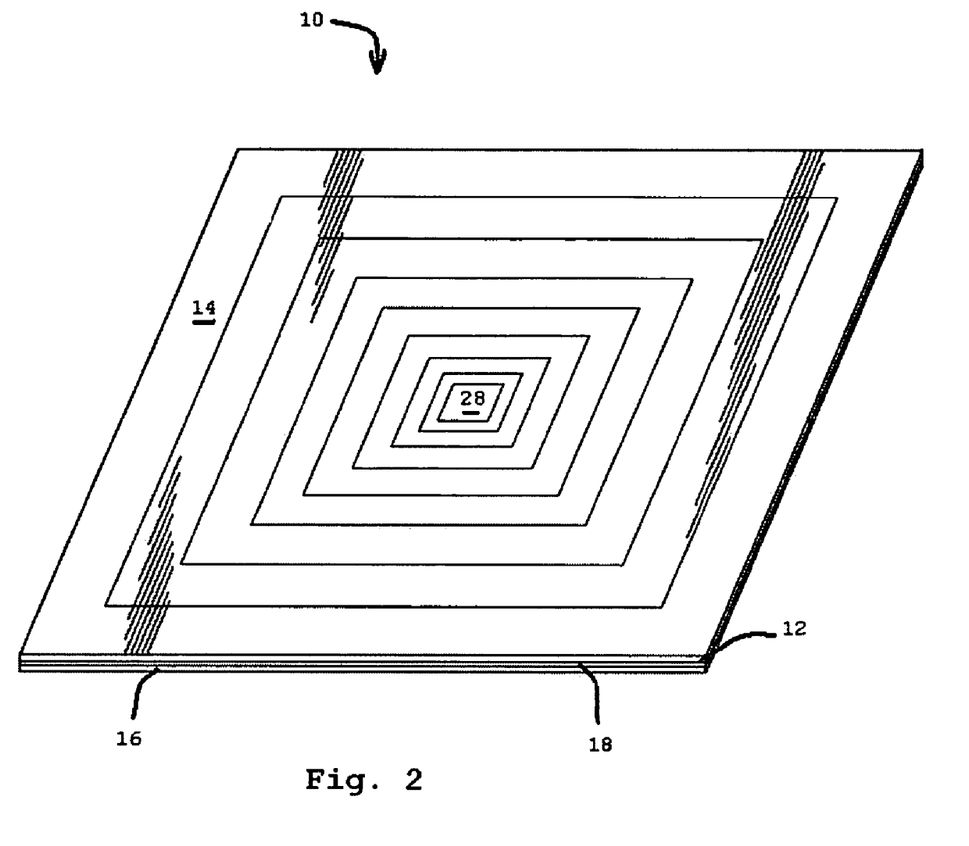
FIG. 2 is an isometric view of the cropping device shown in FIG. 1, illustrating the cropping frames releasably mounted on a substrate.

As shown in FIG. 2, the cropping device 10 also includes a mount 16, which is a release liner or substrate, and an adhesive layer 18. The adhesive layer 18 releasably holds the frames 14a-h in place on the substrate 16. The substrate 16 holds the frames 14 in a nested array for display to facilitate selection of the appropriate frame for cropping a particular photograph. The frames 14 are releasably connected to the substrate 16 to facilitate separation and removal from the cropping device 10 and repositioning on the substrate 16 after use. The adhesive layer 18 releasably attaches each frame 14 to the substrate 16 so that any selected frame 14 can be removed from and repositioned on the substrate 16. The adhesive layer 18 includes a preselected adhesive or cohesive that facilitates attachment of the frame 14 to the cropping device 10. The adhesive or cohesive in the adhesive layer 18 also facilitates removal of the frame 14 from the cropping device 10 and reattachment thereto.

The frames 14 are arranged for display and selection on the substrate 16. The substrate 16 holds the frames 14 in place with the sheet 12 defining a predetermined nested, concentric geometric pattern. The adhesive layer 18 reversibly bonds the frames 14 to the substrate 16 facilitating display, selection, and removal.

Figure 1:
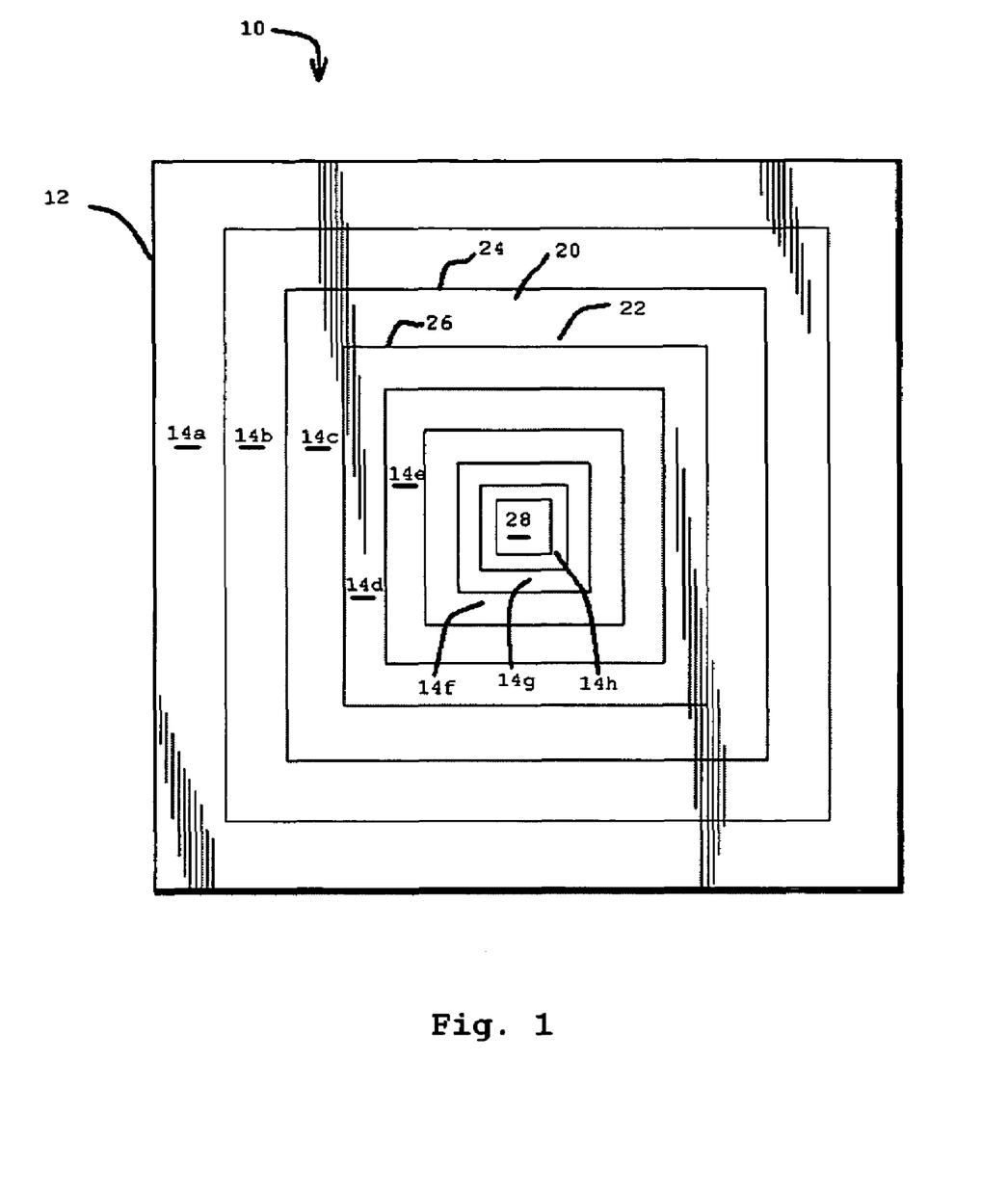
FIG. 1 is a top plan view of a cropping device, illustrating a plurality of cropping frames releasably mounted in a nested array on a substrate, in accordance with the invention.

As illustrated in FIG. 1, each frame 14 includes an outer peripheral edge portion 20 and an inner peripheral edge portion 22. As seen for frame 14c, the outer edge portion 20 is defined by an outer perimeter or boundary 24. The inner edge portion 22 is defined by an inner perimeter or boundary 26. The inner perimeter 26 defines a viewing area 28. The frames 14 are arranged in a concentric array or series, so that the viewing area 28 of each frame increases from the innermost frame 14h to the outermost frame 14a. The geometry of the inner perimeter 26 corresponds to the geometry of the outer perimeter 24, so that the frames 14 abut one another in a continuous manner when positioned in the nested arrangement as shown in FIGS. 1 and 2.

The dimensions of the frames 14 are not critical. However, the frames 14 have preselected dimensions, so that at least one of the frames 14 has dimensions that correspond to standard sized picture frames in the preferred embodiment. Standard sized picture frames correspond to any widely available size for uncropped printed photographs or commercially available stock paper, including, but not limited to: 2"×2"; 2"×3"; 3.5"× 3.5"; 3.5"×5"; 4"×6"; 5"×7"; 8"×10"; 8.5"×11"; 9"×12"; and 11"×14".

Figure 3:
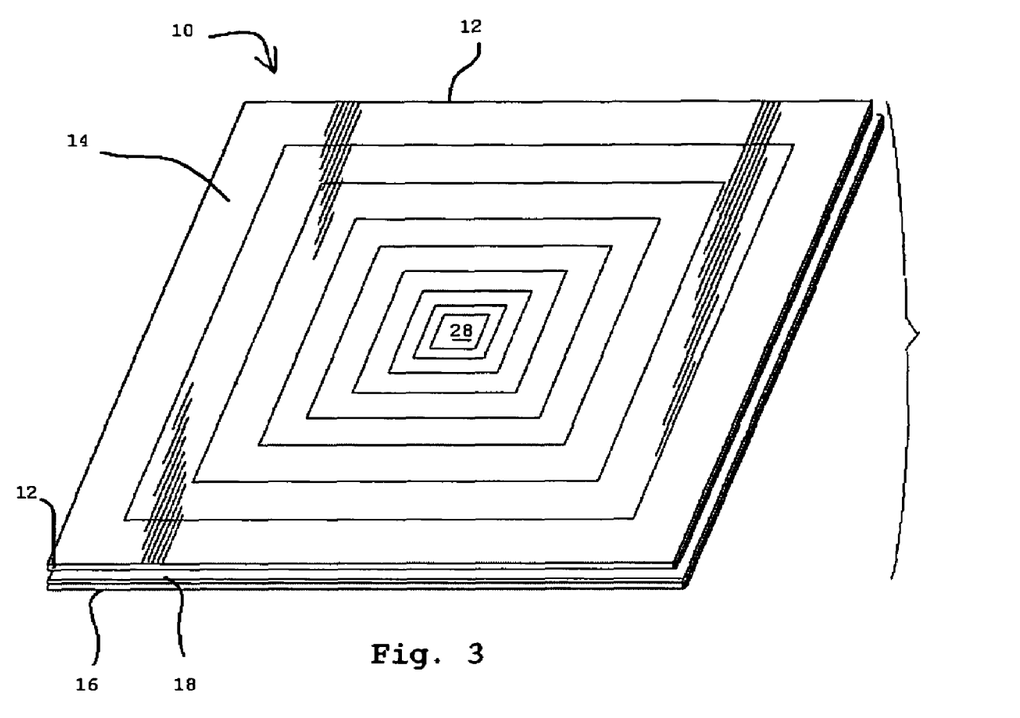
FIG. 3 is an exploded isometric view of the cropping device similar to FIG. 2, illustrating the separation of the sheet of cropping frames from the substrate.
Figure 4:
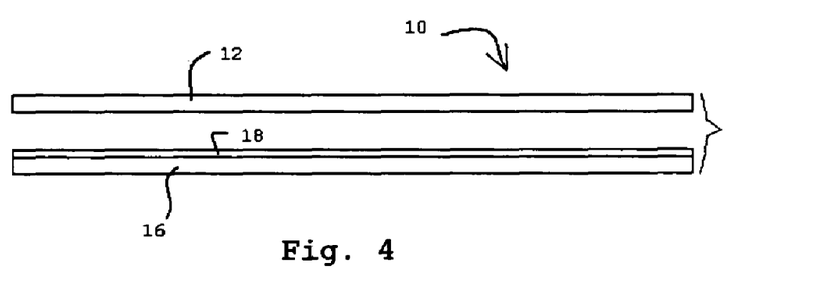
FIG. 4 is an exploded view in side elevation of the cropping device, illustrating the separation of the sheet of cropping frames from the substrate.
Figure 5:
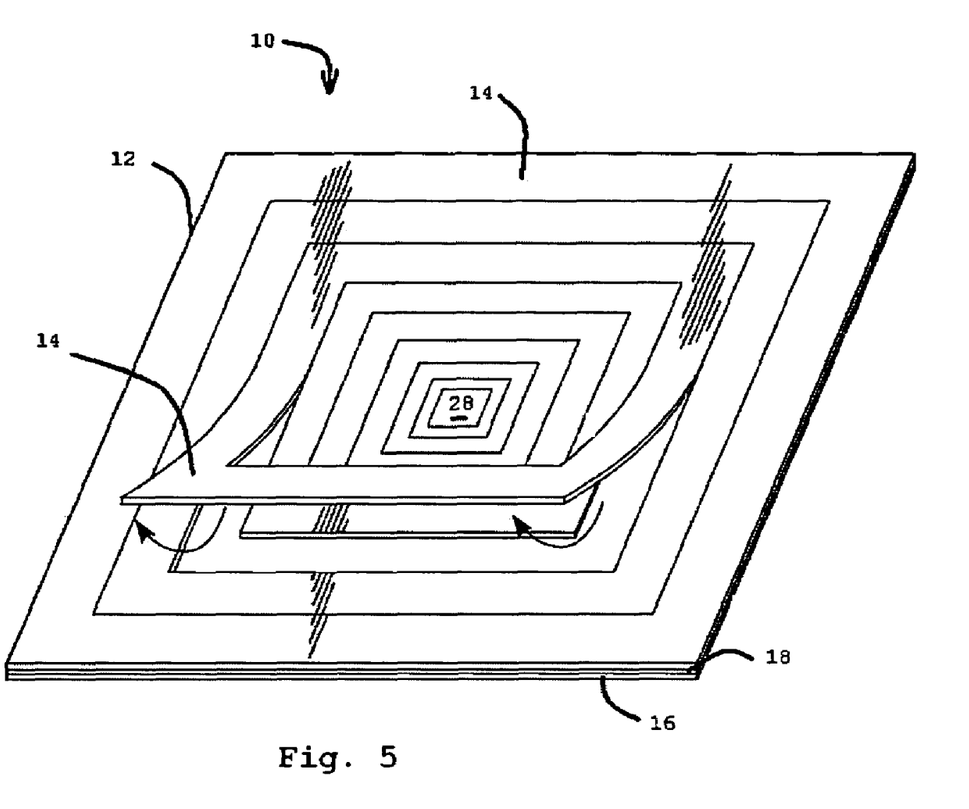
FIG. 5 is an isometric view of the cropping device similar to FIG. 2, illustrating the partial separation of a selected cropping frame from the array of cropping frames on the substrate.
Figure 6:
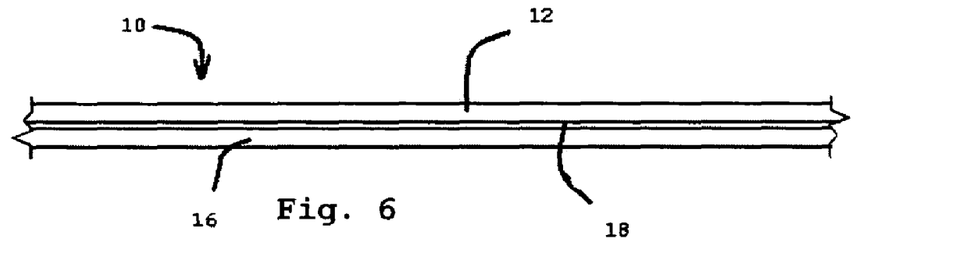
FIG. 6 is a fragmentary view in side elevation of the cropping device shown in FIG. 1.

Referring now to FIGS. 3-4, the adhesive layer 18 is made from a suitable adhesive or cohesive material that reversibly bonds the sheet 12 to the substrate 16. The adhesive layer 18 does not remain attached to the frames 14 upon separation from the substrate 16. The adhesive layer 18 remains attached to the substrate 16 upon separation of the entire sheet 12 from the substrate 16. Similarly, the adhesive layer 18 remains attached to the substrate 16 upon separation of individual frames 14 from the substrate 16. The adhesive or cohesive material in the adhesive layer 18 also allows the sheet 12 or individual frames 14 to be reattached to the substrate 16 after separation.

The adhesive layer 18 is made from a suitable adhesive or cohesive material. Suitable materials include thermoplastic, thermoset, or network polymers suitable for reversibly bonding the substrate 16 to the frames 14 and for permanently or semi-permanently bonding the adhesive layer 18 to the substrate 16. Preferably, the adhesive layer 18 is a releasable pressure sensitive adhesive. In one embodiment, the adhesive layer 18 includes a generic microsphere acrylic emulsion adhesive provided by Ashland Chemical of Covington, Ky.; National Starch & Chemical Company of Bridgewater, N.J.; or Franklin International of Columbus, Ohio.

The sheet 12 forming the frames 14a-h is made from any suitable relatively thin material, including flexible, semi-flexible, rigid, or semi-rigid materials. However, the thickness of the material is not critical. Similarly, the sheet 12 is made from suitable opaque, translucent, or transparent materials. In one embodiment, the sheet 12 is made from a rigid, opaque cardboard eight-point or ten-point cardboard material. In another embodiment each frame 14 is die-cut from the sheet 12 so that the frames 14 are detached from one another and not connected to one another. Yet all the frames are releasably connected to the substrate 16.

The substrate 16 is made from any suitable releasable material, including flexible, semi-flexible, rigid, or semi-rigid material. Similarly, the substrate 16 is made from a suitable opaque, translucent, or transparent material. Suitable materials include, but are not limited to, holographic paper, leather paper, cellophane, or plastic film. Other suitable materials for fabricating the substrate 16 include foam rubber, aluminum foil, and cork. In a preferred embodiment, the substrate 16 is made from a flexible, transparent sheet material, specifically a relatively thin silicone film.

Figure 7:
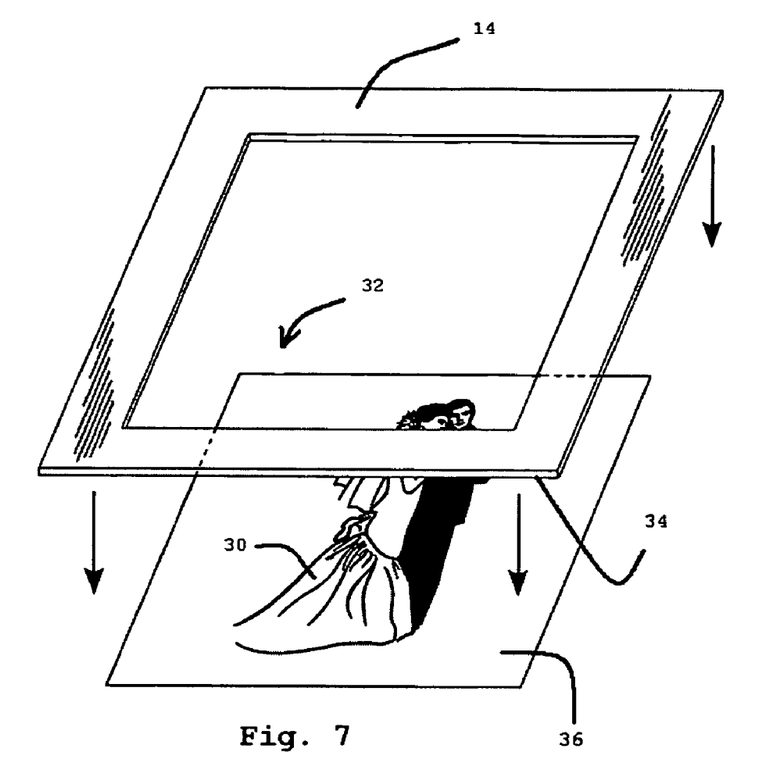
FIG. 7 is an exploded isometric view of a cropping-frame released from the cropping device, illustrating positioning the cropping frame for mounting a photograph.
Figure 8:
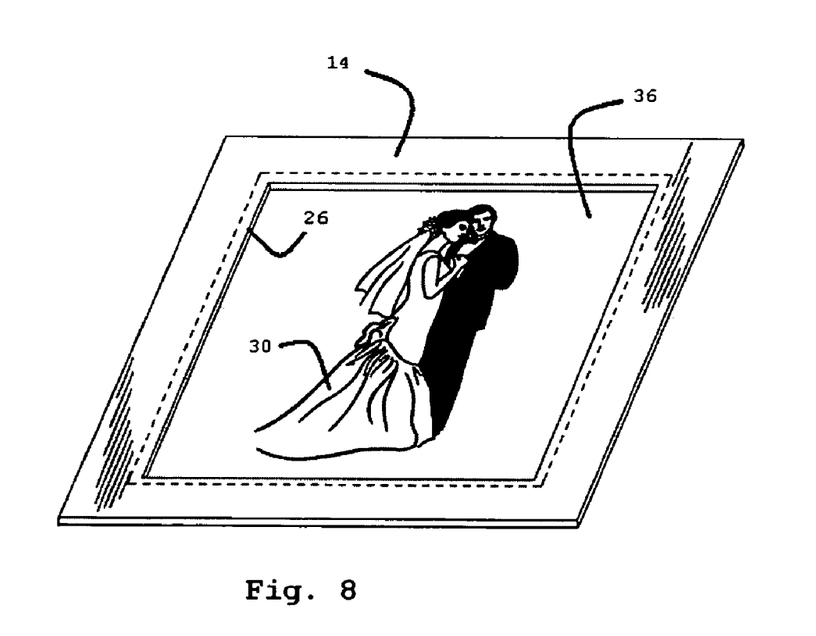
FIG. 8 is an isometric view of the cropping frame mounted on a photograph for selectively cropping the photographic image.
Figure 9:
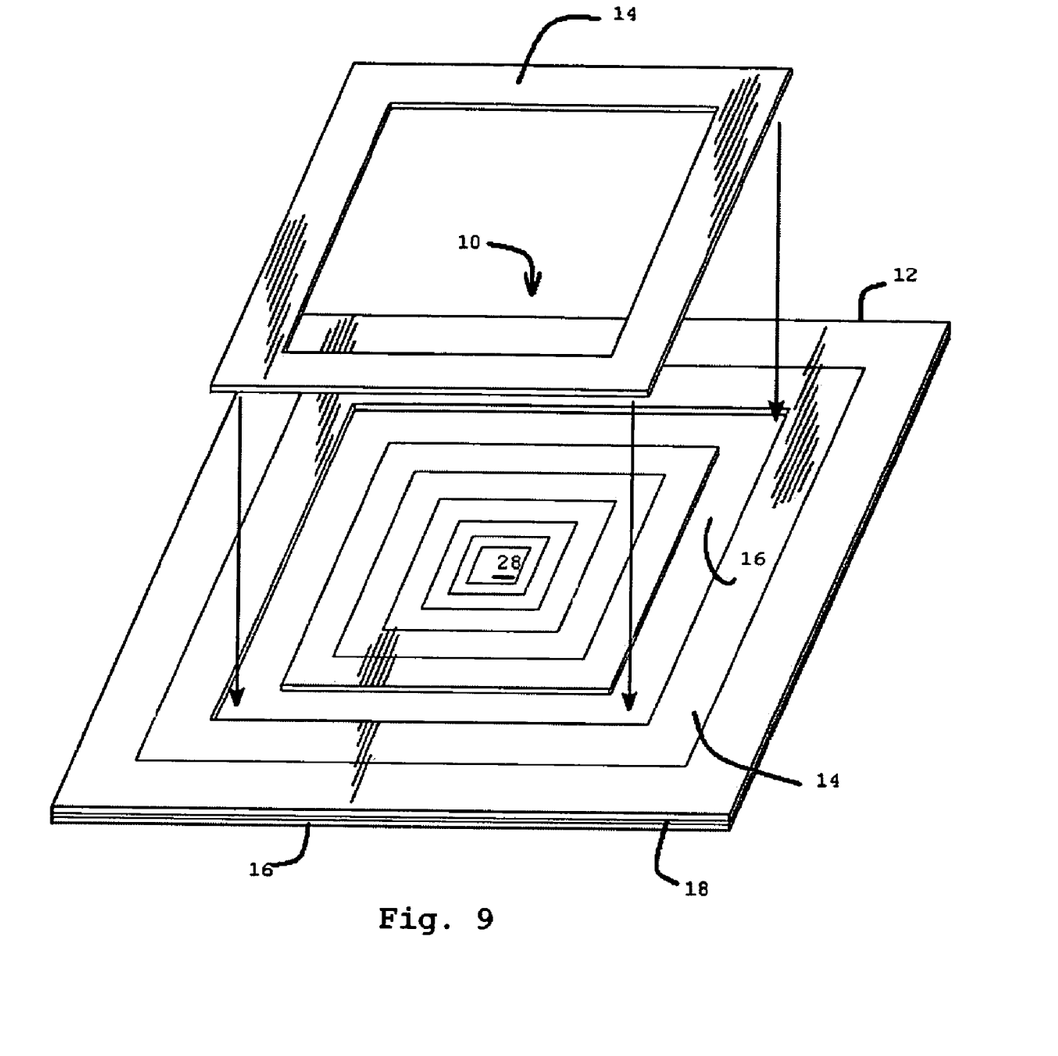
FIG. 9 is an exploded isometric view of a cropping frame in overlying relation with the cropping device for repositioning on the device after use.

Referring now to FIGS. 5-9, the individual frames 14 are used to crop images 30 that are displayed on suitable media 32. The frames 14 are stored for selection on the substrate 16. A selected one of the frames 14 is lifted for separation and removal from the substrate 16. The selected frame 14, as shown in FIGS. 7 and 8, is moved into a position in overlaying relation with the medium 32 to display the cropped image 30. The frame 14 is aligned with the image 30, so that a desirable portion of the image 30 is viewable through the frame viewing area 28. The absence of an adhesive or cohesive on a bottom surface 34 of the frame 14 allows the frame 14 to be repositioned until the desired portion of the image 30 is cropped or selected.

As shown in FIGS. 7-8, the frame 14 is lowered toward the medium 32 until the frame bottom surface 34 contacts a top surface 36 of the medium 32. When the frame bottom surface 34 contacts the medium top surface 36, the frame bottom surface 34 is attached to the top surface 36 through conventional fastening methods, such as through the use of an adhesive or tape. The frame inner perimeter 26 defines an outer perimeter of the cropped image 30.

The image 30 is a printed representation of a subject, such as an object, a person, people, scenery, places, abstract art, reproduction of masterpieces, a poem, a writing, or a combination of these. Preferably, the image 30 has the appearance of a two-dimensional painting, drawing, or photograph. The medium 32, for example, is a photograph, drawing, sketch, painting, finger painting, map, or the like. Most commonly, the medium 32 is a photograph.

Now referring to FIGS. 10-14, there is illustrated another embodiment of the cropping device that is generally designated by the numeral 38. The cropping device 38 includes a sheet 40 that is divided into a plurality of nested cropping frames 42. The cropping device also includes a substrate or a label 44 for holding the frames 42 and an adhesive layer 46 for releasably connecting the frames 42 to the substrate 44. Contrary to the adhesive layer 18 shown in FIG. 2, the adhesive layer 46, shown in FIGS. 11 and 12, remains attached to the frames 42 upon separation of the individual frames 42 from the substrate 44.

Figure 10:
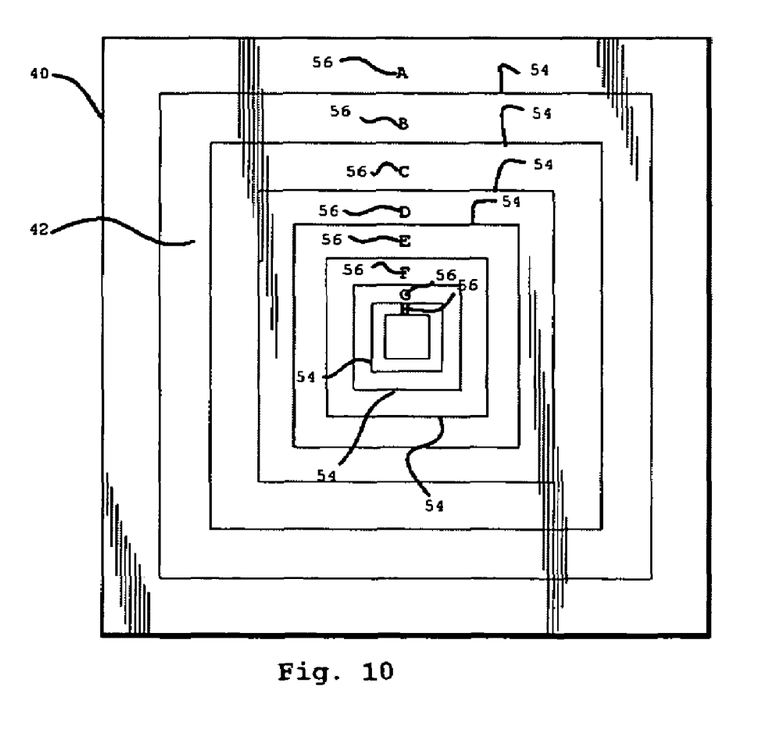
FIG. 10 is a top plan view of another embodiment of the cropping device in accordance with the invention.
Figure 10A:
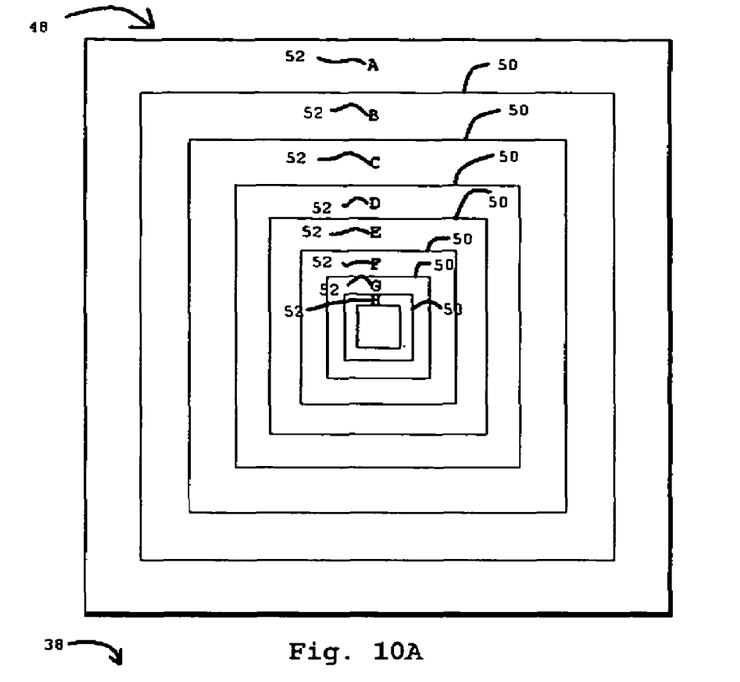
FIG. 10A is a top plan view of a crop selector used in combination with the cropping device shown in FIG. 10.

In operation, as shown in FIG. 10, a practice liner or crop selector 48 is used in combination with the cropping device 38. The crop selector 48 is an essentially planar sheet that includes a plurality of lines 50 and indicia 52 that are used to facilitate selection of an appropriately sized cropping frame 42 from the cropping device 38 shown in FIG. 10. The lines 50 are arranged in a geometric pattern that corresponds to incisions in the sheet 40 that define the edges 54 of the individual cropping frames 42. Each cropping frame 42 includes indicia 56 that corresponds to the crop selector indicia 52.

The crop selector 48 is made from any suitable relatively thin material, including flexible, semi-flexible, rigid, or semi-rigid materials. However, the thickness of the material is not critical. Similarly, the selector 48 is made from suitable opaque, translucent, or transparent materials. Preferably, the selector 48 is made from a transparent plastic sheet, such as a polyurethane or polypropylene sheet, so that a desirable portion of an image for cropping can be previewed through the selector 48 to identify the appropriate frame 42 for detachment from the substrate 44.

Figure 11:
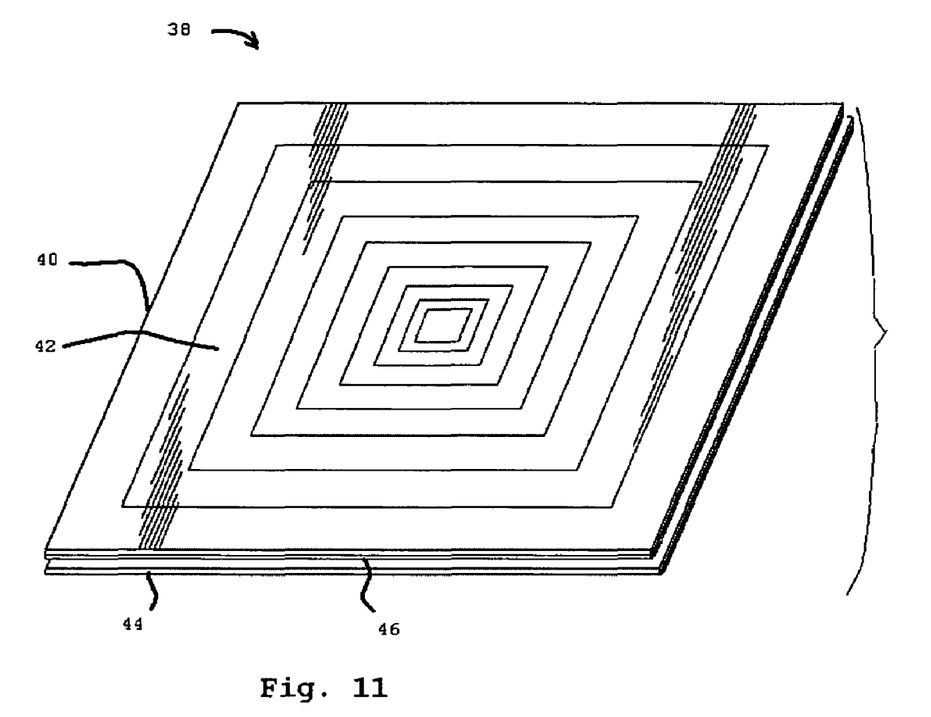
FIG. 11 is an exploded isometric view of the cropping device shown in FIG. 10, illustrating the separation of the sheet of cropping frames from the substrate.
Figure 12:
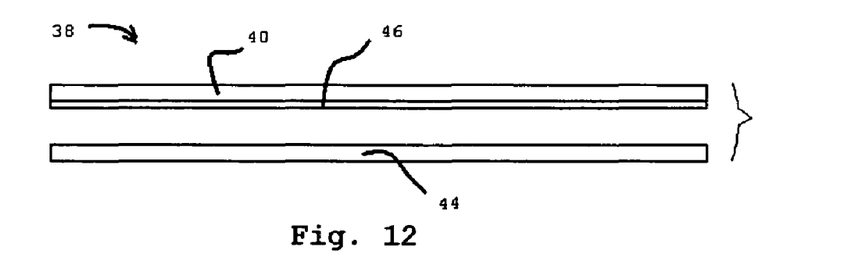
FIG. 12 is an exploded view in side elevation of the cropping devices illustrating the separation of the sheet of cropping frames from the substrate.

Referring now to FIGS. 11-12, the adhesive layer 46 is made from a suitable adhesive or cohesive material that releasably attaches the sheet 40 to the substrate 44. Suitable materials include thermoplastic, thermoset, or network polymers suitable for releasably attaching the substrate 44 to the frames 42. Preferably, the adhesive layer 46 is a pressure sensitive permanent adhesive.

As shown in FIGS. 11-14, the adhesive or cohesive material within the adhesive layer 46 remains attached to the individual frames 42 upon separation from the substrate 44. A portion of the adhesive layer 46 also remains attached to the substrate 44 upon separation of the sheet 40 from the substrate 44. Alternatively, all of the adhesive or cohesive material in the adhesive layer 46 or substantially all of adhesive or cohesive material in the adhesive layer 46 that is adjacent to the individual frames 42 remains attached to those frames 42 upon detachment from the substrate 44.

Figure 13:
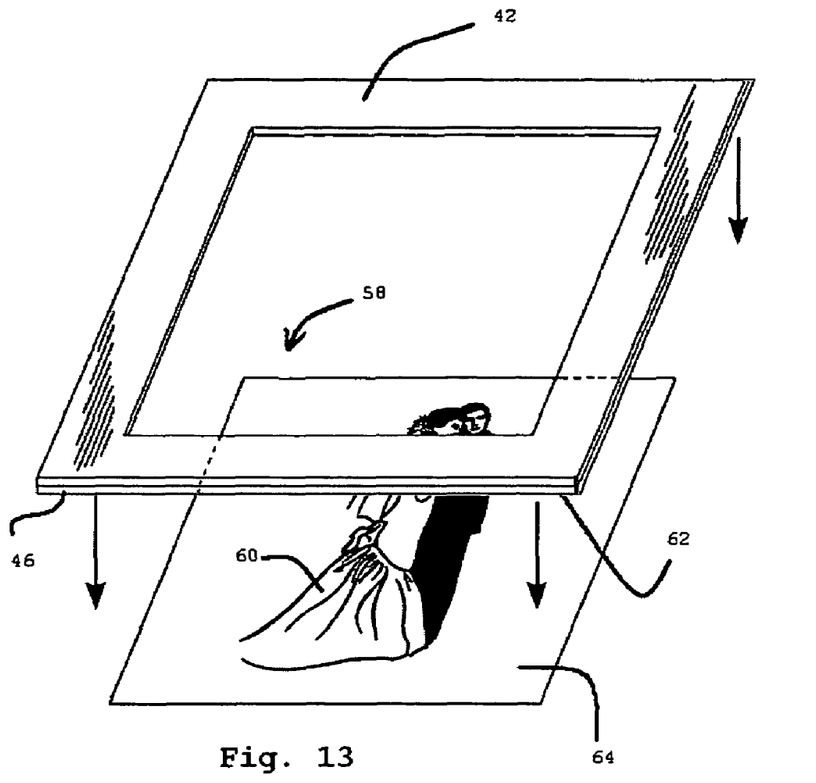
FIG. 13 is an exploded isometric view of a cropping frame released from the cropping device shown in FIG. 10, illustrating positioning the cropping frame for mounting on a photograph.
Figure 14:
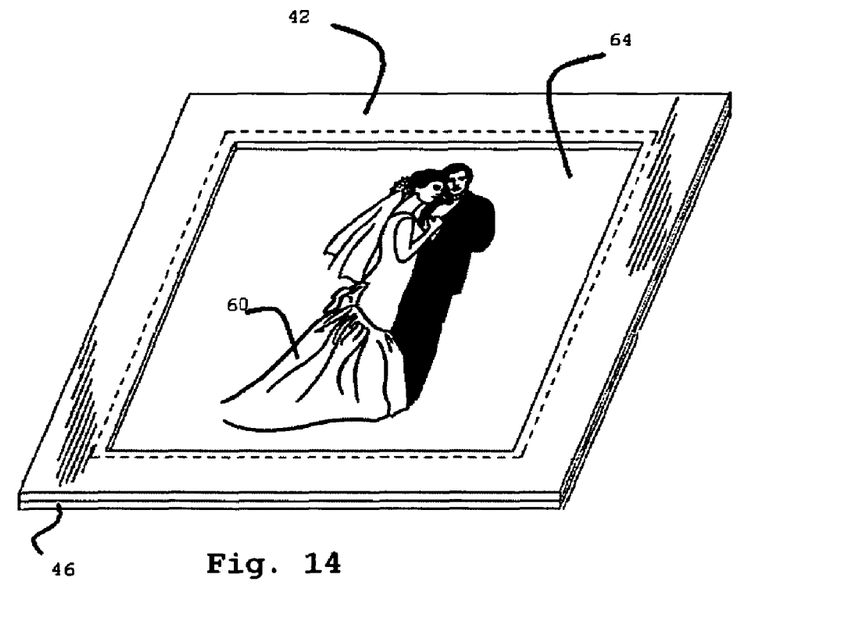
FIG. 14 is an isometric view of the cropping frame shown in FIG. 13 secured by an adhesive layer on the photograph.

As illustrated in FIGS. 13 and 14, the adhesive or cohesive material within the adhesive layer 46 also attaches or bonds the individual frames 42 to a medium 58 that includes the image 60 for cropping. The frame 42 is lowered toward the medium 58 until the frame bottom surface 62 contacts a top surface 64 of the medium 58. When the frame bottom surface 62 contacts the medium top surface 64, the adhesive layer 46 connects the frame bottom surface 62 to the top surface 64.

Unlike the frame 14 shown in FIGS. 7 and 8, the frame 42 shown in FIGS. 13 and 14 cannot be continuously repositioned on the medium 58. The adhesive layer 46 will form a bond between the frame 42 and the medium, either instantaneously or over time. Preferably, the adhesive layer 46 is initially tacky and bonds the frame 42 to the medium 58 within twenty-four hours.

Figure 15:
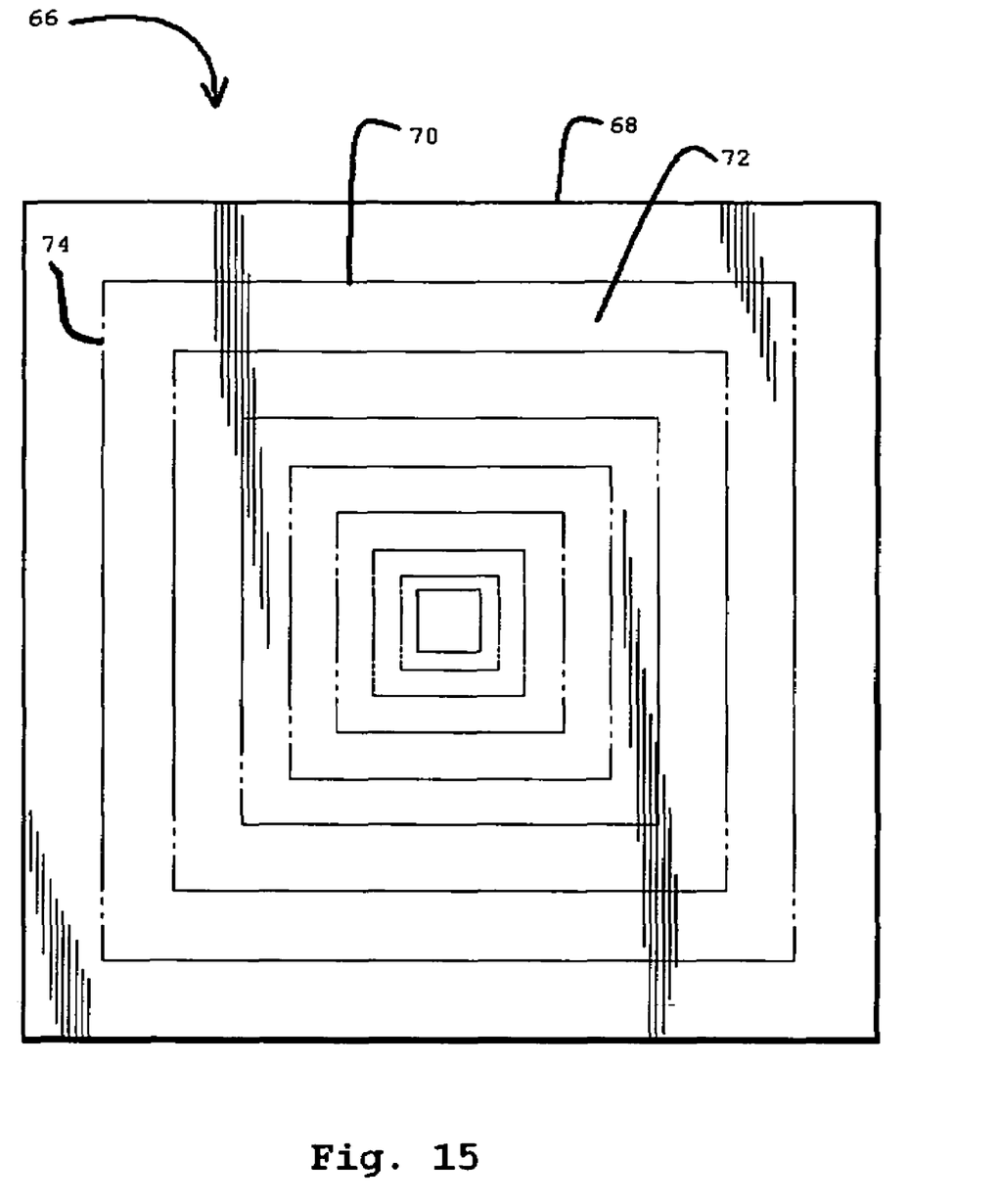
FIG. 15 is a top plan view of an additional embodiment of the cropping device in accordance with the invention.
Figure 16:
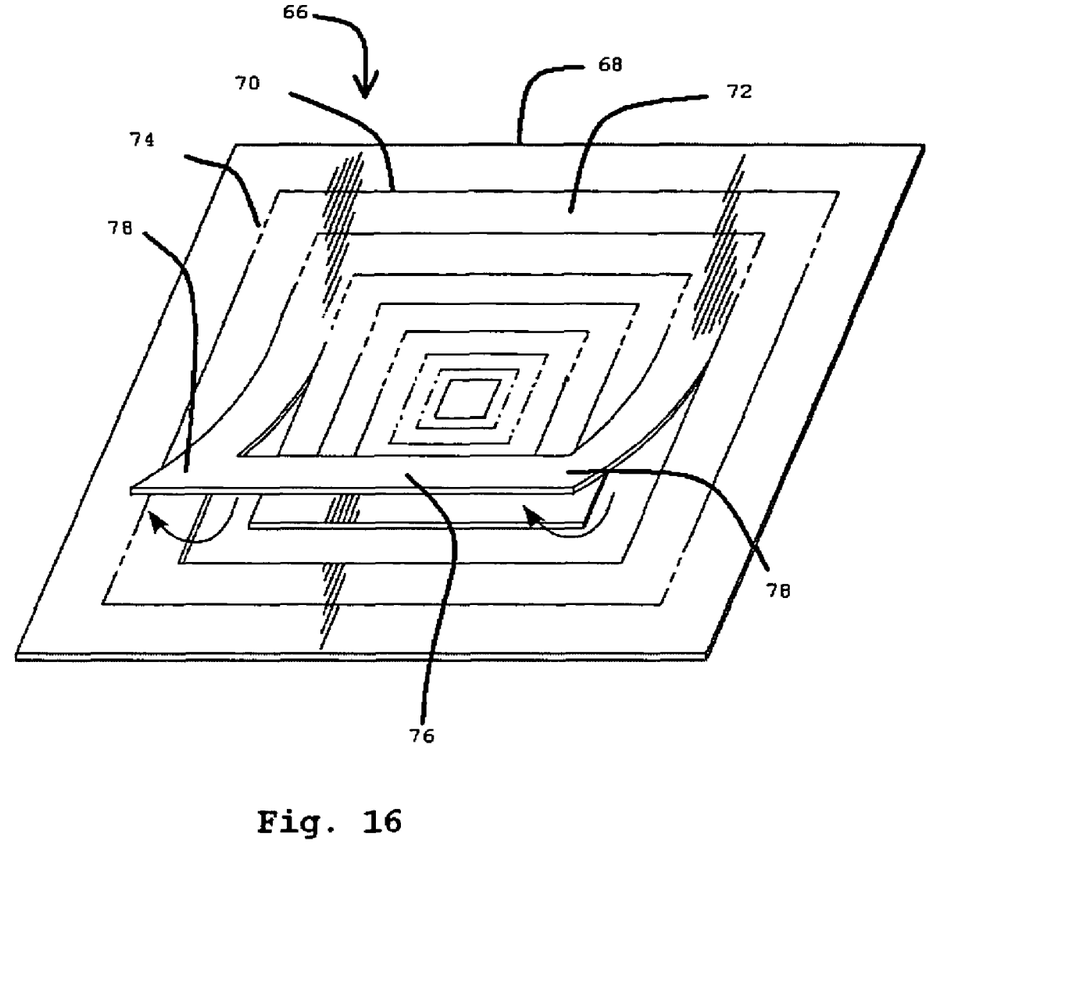
FIG. 16 is a an isometric view of the cropping device shown in FIG. 15, illustrating the partial separation of a selected cropping frame from the array of cropping frames.

Now referring to FIGS. 15 and 16, there is illustrated an additional embodiment of the cropping device generally designated by the numeral 66. The cropping device 66 includes an essentially planar mask or sheet 68 that includes a plurality of incisions 70 that define a plurality of frames 72. In comparison to the embodiment illustrated in FIGS. 1-14 with the embodiment shown in FIGS. 15 and 16, the incisions 70 include a plurality of micro-perfs or tags 74 to facilitate connection of the frames 72 to one another. This permits repositioning of the frames 42 on the medium 58 before the adhesive layer 46 cures on the frame 42.

The frames 72 are arranged in a similar array abutting one another in a nested series. The incisions 70 separate the frames 72 from one another to allow a suitable frame to be selected to crop images in a similar manner as is shown in FIGS. 7-8. The incisions 70 are produced in any suitable manner, preferably by die-cutting the mask 68. The die-cutting process produces the micro-perfs 74 that connect the frames 72 to one another.

As shown in FIG. 16, the incisions 70 allow the frames 72 to be separated from one another. The frames 72 include side portions 76 and corner portions 78 suitable for manual or mechanical grasping. The frame side portions 76 and corner portions 78 are detached and lifted to achieve separation. Then, the frames 72 are positioned over the medium 30 for attachment thereto in the manner shown in FIGS. 7-8. The frames 72 are attached to photographs or other suitable media through conventional fastening methods, such as through the use of an adhesive or tape.

Now referring to Fi-gu-re 17, there is illustrated a further embodiment of the cropping device generally designated by the numeral 80. In comparison to the embodiments illustrated in FIGS. 1, 10, and 15, the cropping device 80 has a generally star-shaped configuration.

Figure 17:
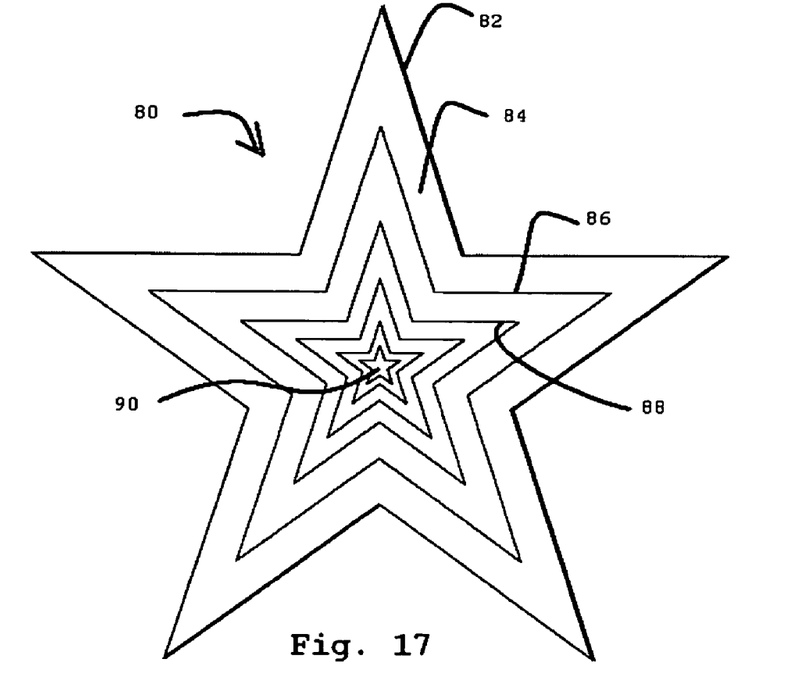
FIG. 17 is a top plan view of a further embodiment of the cropping device in accordance with the invention, illustrating the cropping frames arranged in a star-shaped geometric pattern.

The cropping device 80 includes a sheet 82 that is divided into a plurality of frames 84. Each frame 84 includes an outer perimeter 86 and an inner perimeter 88. The outer perimeter 86 and the inner perimeter 88 have a star-shaped configuration to facilitate the arrangement of the frames 84 in an abutting, continuous nested series. The inner perimeter 88 of each frame 84 defines a star-shaped viewing area 90.

Figure 18:
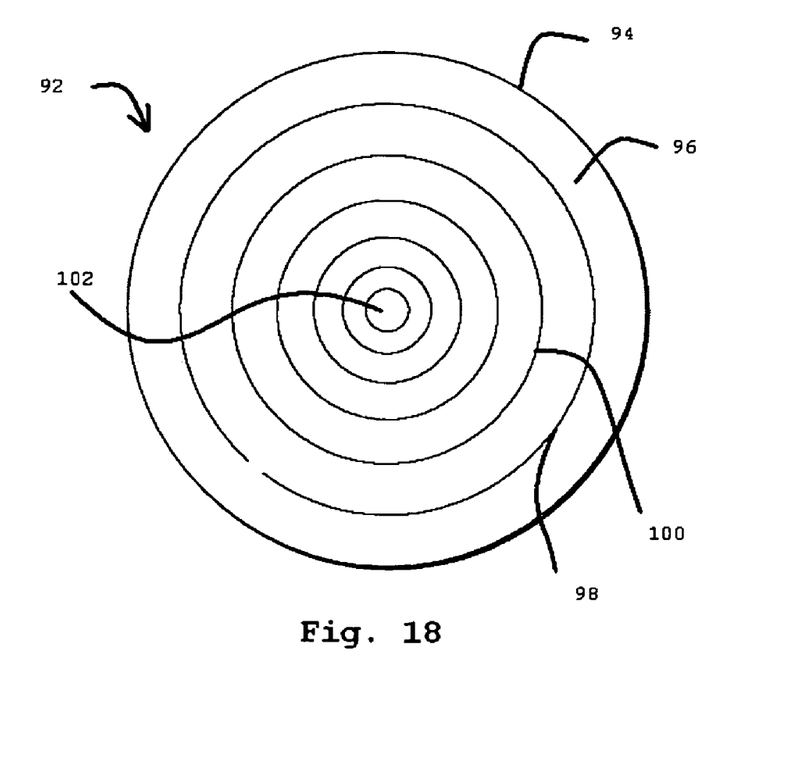
FIG. 18 is a top plan view of a further embodiment of the cropping device in accordance with the invention, illustrating the cropping frames arranged in a circular geometric pattern.

Referring to FIG. 18, there is illustrated a further embodiment of the cropping device generally designated by the numeral 92. In comparison to the embodiments illustrated in FIGS. 1, 10, 15, and 17, the cropping device 92 has a generally circular configuration.

The cropping device 92 includes a sheet 94 that is divided into a plurality of frames 96. Each frame 96 includes an outer perimeter 98 and an inner perimeter 100. The outer perimeter 98 and the inner perimeter 100 have a circular configuration to facilitate the arrangement of the frames 96 in an abutting, continuous nested series. The inner perimeter 100 of each frame 96 defines a circular viewing area 102.

Figure 19:
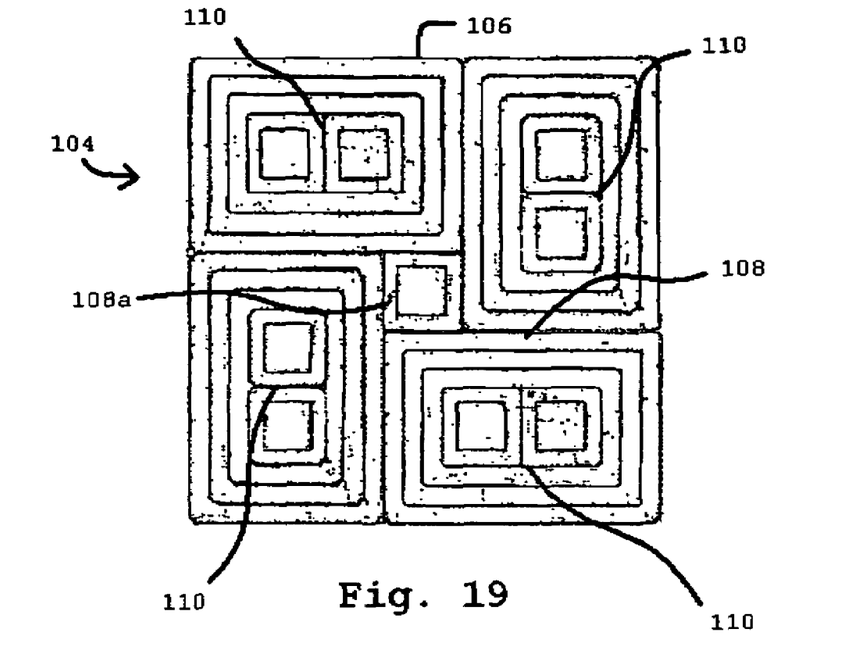
FIG. 19 is a top plan view of a further embodiment of the cropping device in accordance with the invention, illustrating the cropping frames arranged in another geometric pattern.

Referring now to FIG. 19, there is illustrated a further embodiment of the cropping device generally designated by the numeral 104. The cropping device 104 includes a sheet 106 that is divided into a plurality of individual cropping frames 108. In comparison to the embodiments illustrated in FIGS. 1, 10, 15, 17, and 18, the cropping frames 108 are arranged in a geometric pattern that includes a plurality of arrays 110 of frames 108 in nested, concentric series. The frames also include a center frame 108a that abuts each frame array 110.

Figure 20:
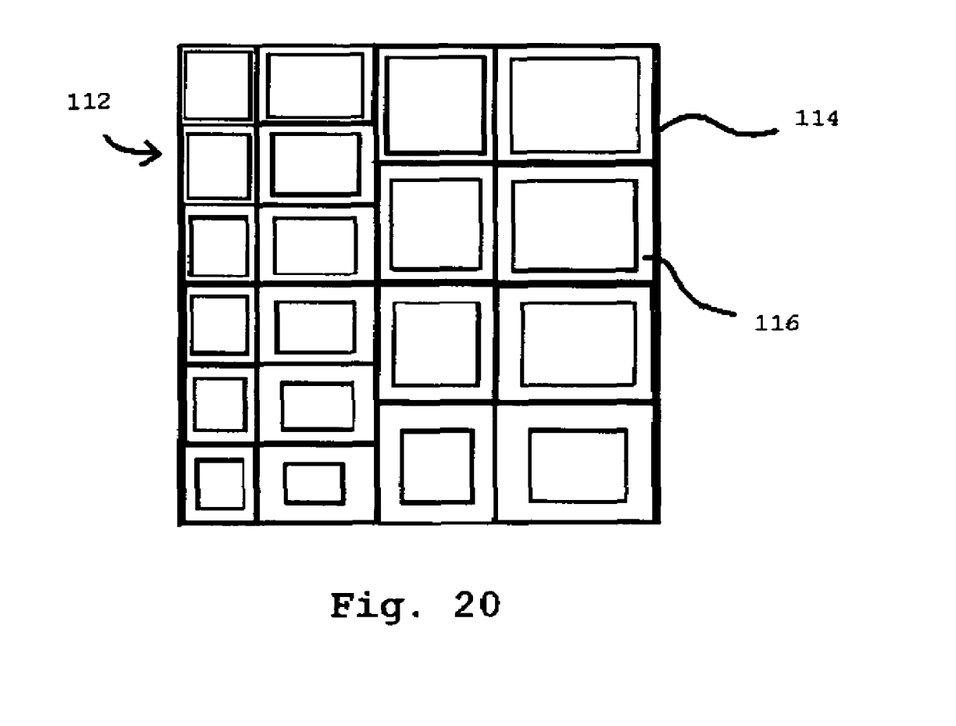
FIG. 20 is a top plan view of a further embodiment of the cropping device in accordance with the invention, illustrating the cropping frames arranged in an additional geometric pattern.

Referring now to FIG. 20, there is illustrated a further embodiment of the cropping device generally designated by the numeral 112. The cropping device 112 includes a sheet 114 that is divided into a plurality of individual cropping frames 116. In comparison to the embodiments illustrated in FIGS. 1, 10, 15, 17-18, and 19, the cropping frames 114 are arranged in a geometric pattern that does not include frames 116 arranged in nested, concentric series.

It should be understood that alternative embodiments are contemplated in accordance with the present invention and include embodiments in which the cropping device or cropping frames have triangular, rectilinear, rectangular, squiggly, picket, heart, club, diamond, spade, or other similar configurations. Also, it should-be understood that alternative embodiments are contemplated in accordance with the present invention and include embodiments in which the cropping frames are comprised of individual, separable frame elements. These frame elements are produced by die-cutting individual frames or through other suitable methods.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A cropping device comprising:
   a sheet defining a plurality of detachable frames with each frame being essentially detached from one another and including an outer portion having a preselected geometry and an inner portion defining a viewing area,
   a substrate for holding said frames in abutting relation to one another thereon with said frames forming an array to facilitate selection of an appropriately sized frame for cropping an image,
   an adhesive layer for releasably connecting said frames to said substrate, and
   said sized frame connecting to a medium for displaying an image for cropping with an outer perimeter of said sized frame viewing area defining an outer boundary for the cropped image.

2. A cropping device as set forth-in claim 1 in which:
   said adhesive layer is permanently bonded to the substrate and releasably bonded to the frames.

3. A cropping device as set forth in claim 2 in which:
   said adhesive layer includes a releasable pressure sensitive adhesive.

4. A cropping device as set forth in claim 1 in which:
   said adhesive layer is releasably bonded to the substrate and permanently bonded to the frames.

5. A cropping device as set forth in claim 4 in which:
   said adhesive layer bonds the medium to said sized frame.

6. A cropping device as set forth in claim 4 which includes:
   a transparent crop selector.

7. A cropping device as set forth in claim 1 in which:
   each frame outer portion has the same configuration, and
   said frames form an array of nested frames in which said viewing area of each frame increases from an innermost frame to an outermost frame.

8. A cropping device as set forth in claim 7 in which:
   said viewing area of each frame has the same configuration as said outer portion preselected geometry to facilitate positioning said frames in abutting relation to one another.

9. An apparatus for cropping images comprising:
   an essentially planar mask having a plurality of incisions with preselected geometries and dimensions to form a plurality of essentially detached die-cut cropping frames,
   each cropping frame having an inner edge defining a viewing area for displaying a cropped image and an outer edge abutting an adjacent frame, means for releasably holding said cropping frames in a predetermined pattern to facilitate the selection of an appropriately sized cropping frame, and said sized cropping frame having the ability to detach separate from said mask and attach to a medium for displaying an image for cropping with an outer perimeter of said sized frame viewing area defining an outer boundary for the cropped image.

10. An apparatus as set forth in claim 9 in which:
said connecting means includes a substrate and an adhesive layer, and
said adhesive layer is permanently bonded to said substrate and releasably bonded to said frames.

11. An apparatus as set forth in claim 10 in which:
said adhesive layer includes a releasable pressure sensitive adhesive.

12. An apparatus as set forth in claim 10 in which:
said substrate includes a flexible film.

13. An apparatus as set forth in claim 9 which includes:
said connecting means includes a substrate and an adhesive layer, and said adhesive layer is releasably bonded to said substrate and permanently bonded to said frames.

14. An apparatus as set forth in claim 13 in which:
said adhesive layer bonds the medium to said sized frame.

15. An apparatus as set forth in claim 14 in which:
a transparent crop selector.

16. An apparatus as set forth in claim 9 which includes:
each frame outer edge has the same configuration, and
said frames form an array of nested frames in which said viewing area of each frame increases from an innermost frame to an outermost frame.

17. An apparatus as set forth in claim 16 which includes:
said viewing area of each frame has the same configuration as said outer edge preselected geometry to facilitate positioning said frames in abutting relation to one another.

18. An apparatus as set forth in claim 9 in which:
said mask includes a die cut material for forming said frames.

19. An apparatus as set forth in claim 9 in which:
said mask includes a rigid opaque material.

20. An apparatus as set forth in claim 9 which includes:
means for attaching said sized cropping frame to the medium.

21. An apparatus as set forth in claim 20 which includes:
said attaching means includes an adhesive.

22. A method for cropping an image comprising:
releasably mounting an essentially planar sheet on a substrate,
sectioning the sheet to form a plurality of connected cropping frames of preselected geometries and sizes with each frame having a preselected viewing area,
positioning the frames in a predetermined pattern in abutting relation to one another to facilitate the selection of one of the cropping frames,
separating a selected cropping frame from the planar sheet,
positioning the selected cropping frame in overlying relation to an image storage medium,
aligning the selected cropping frame viewing area with an image on the image storage medium so that the perimeter of the viewing area corresponds to the boundary of a desired portion of the image, and
attaching the selected cropping frame to the image storage medium.

23. A method as set forth in claim 22 which includes:
providing a die cut planar sheet for sectioning into the cropping frames.

24. A method as set forth in claim 22 which includes:
providing an essentially opaque rigid die cut planar sheet for sectioning into the cropping frames.

25. A method as set forth in claim 22 which includes:
bonding an adhesive layer to the substrate to releasably attach the substrate to the sheet.

26. A method as set forth in claim 22 which includes:
bonding an adhesive layer to the sheet to releasably attach the substrate to the sheet.

27. A method as set forth in claim 22 which includes:
arranging the frames in an array of nested frames in which the viewing area of each frame increases from an innermost frame to an outermost frame.

* * * * *